Sept. 1, 1959 P. E. MORGAN 2,902,081
MACHINES FOR PRODUCING POROUS PLASTIC BLOCKER INSOLES
Filed Jan. 20, 1955 3 Sheets-Sheet 1

Inventor
Paul E. Morgan
By his Attorney

Sept. 1, 1959 P. E. MORGAN 2,902,081
MACHINES FOR PRODUCING POROUS PLASTIC BLOCKER INSOLES
Filed Jan. 20, 1955 3 Sheets-Sheet 3

Inventor
Paul E. Morgan
By his Attorney

United States Patent Office 2,902,081
Patented Sept. 1, 1959

2,902,081

MACHINES FOR PRODUCING POROUS PLASTIC BLOCKER INSOLES

Paul E. Morgan, Melrose, Mass., assignor to United Shoe Machinery Corporation, Flemington, N.J., a corporation of New Jersey Application January 20, 1955, Serial No. 482,922

3 Claims. (Cl. 154—1)

This invention relates to an apparatus for alining and bonding or laminating preshaped work pieces by means of an adhesive and particularly to a machine which automatically alines and bonds the elements of a blocker insole to form a multi-layer lamination.

In the manufacture of shoes, it has been proposed to employ a blocker insole of fiber backed porous plastic, but no suitable means has been available for bonding accurately the necessary preshaped sheet work pieces, herein illustrated as fiber and porous plastic blocker insole elements. Apparatuses used in the past for bonding sheet work pieces, hereinafter called work pieces, such as the preshaped elements illustrated in the drawings, have required stacking and alinement of the work pieces in one piece of equipment and transport of the resulting alined stack of work pieces to a separate pressing apparatus where the work pieces were to be bonded. Many inaccuracies occurred when the preshaped work pieces were thus alined and bonded in separate apparatuses and the final bonded products often were non-uniform in character.

It is an object of this invention to provide a novel and improved apparatus for use in alining and bonding work pieces such as the elements of a laminated blocker insole and for releasing the bonded product from the apparatus.

Another object of this invention is to provide a machine which will perform the above operations automatically.

With the above object in view the present invention contemplates the provision in a machine for assembling work pieces to provide a laminated structure of a pair of mutually opposed pressure applying members or platens vertically arranged to receive between them work pieces. In the pressure station the work pieces are mounted on two work supporting members one of which is agitated to effect the alinement of the work pieces. To provide for the automatic discharge of the work from the pressure station one of the work supporting members is movable bodily to provide a passageway through which the work passes.

These and other features of the invention will now be described with reference to the accompanying drawings and pointed out in the appended claims.

In the drawings,

Fig. 4 is a view looking in the direction of the arrow A in Fig. 2;

Fig. 5 is a view looking in the direction of the arrow B in Fig. 2;

Fig. 6 is a perspective view of a blocker insole partly broken away, partly in section and partly peeled back, which was laminated in the apparatus of the present invention.

Figure 1:
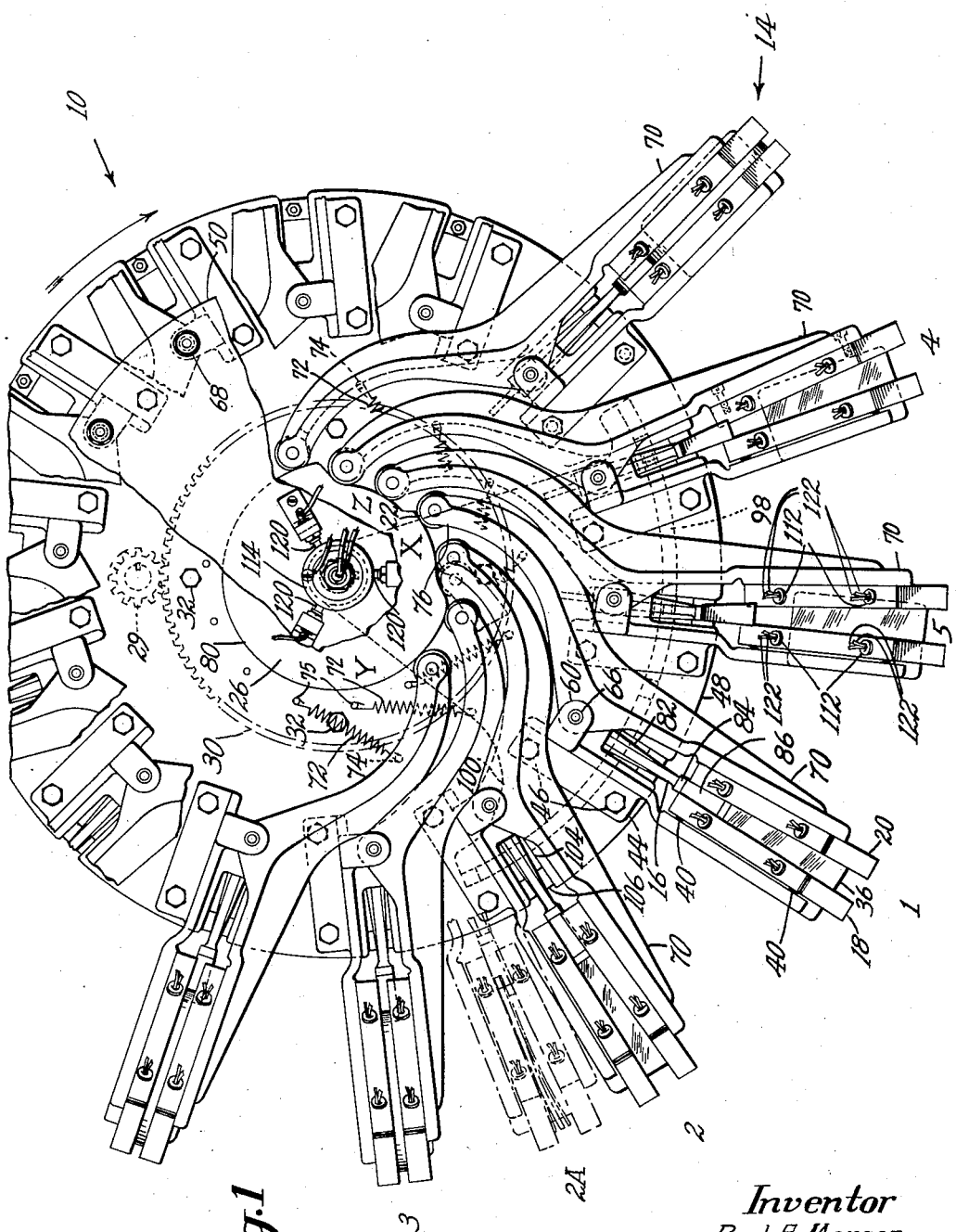
Fig. 1 is a plan view with certain parts broken away of a laminating machine having a plurality of laminating apparatuses, embodying the features of the present invention.
Figure 2:
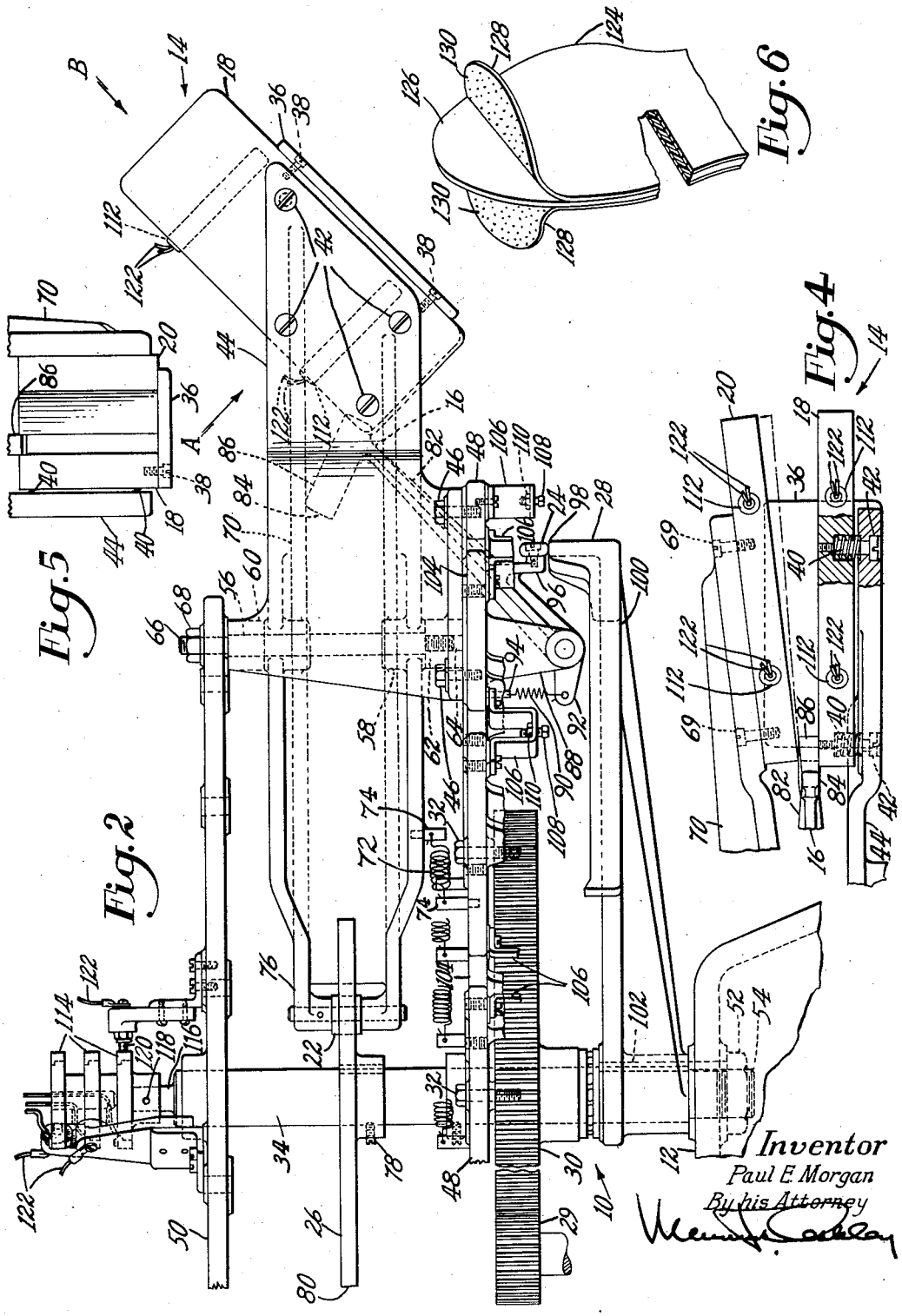
Fig. 2 is a view in elevation of one of the laminating apparatuses shown attached to the machine of Fig. 1, with the other apparatuses removed for purposes of clarity.

Referring to the drawings and more particularly to Figs. 1 and 2, the features of the invention are shown as embodied in a machine 10 having a base 12 on which fourteen laminating apparatuses, each indicated generally by the reference character 14, are mounted for rotational movement. At position 1 work pieces comprising the elements of a blocker insole are loaded into an apparatus 14 which then moves in a clockwise direction around the base 12 until it reaches position 2A where the end member 16 of the apparatus 14 rises and then drops abruptly to lift the work pieces and drop them sharply thereby alining them. Following this alining operation the apparatus continues rotating to position 3 where the side members or platens 18 and 20 of the apparatus press the work pieces together to bond or laminate them. This pressing continues while the apparatus rotates to positions 4 and 5 where the pressing is discontinued and the work supporting end member 16 rises to open a passageway through which the resulting laminated blocker insole may be discharged by gravity from the apparatus. Once the end member 16 drops back to its rest position, shown as position 1, the cycle is repeated. Each of the fourteen apparatuses 14 successively goes through a like cycle so that for each complete rotation of the machine fourteen blocker insoles are produced. For purposes of description the construction of a single laminating apparatus and its cooperation with the machine will be discussed herein. It is to be understood, however, that each of the laminating apparatuses is similar to, and is connected with the machine similarly to, the one described.

The operating members of the laminating apparatus are actuated by contact of cam followers mounted on the laminating apparatus, for purposes of description cam rolls 22 and 24, with cams 26 and 28 affixed to the base as the laminating apparatus rotates about the base. A drive gear 29 engages a gear plate 30 to which the laminating apparatus 14 is attached with bolts 32, thereby causing the gear plate and the laminating apparatus to rotate on a shaft 34.

Each apparatus 14 comprises a receptacle having an inclined work supporting bottom member 36, a work supporting end member 16, a spring mounted side member or platen 18 and a movable side member or platen 20. The bottom member 36 is arranged perpendicularly to the side members and is attached with screws 38 to the side member 18 which in turn is attached by springs 40 and bolts 42 to the bracket 44 which is secured with bolts 46 to a lower plate 48. This plate 48 and an upper plate 50 are mounted rotatably on the shaft 34 which is fixed to the base 12 by a nut 52 screwed onto a threaded, reduced portion 54 of the shaft 34. A rod 56 extends between the lower and upper plates 48 and 50 passing through the bracket 44 at lower and upper extensions 58 and 60 thereon. A threaded, reduced portion 62 of the rod 56 screws within a threaded portion 64 of the extension 58, and a further threaded reduced portion 66 of the rod 56 passes through the plate 50 and is secured thereto by a nut 68 above it.

Each movable side member 20 is attached by means of screws 69 (Fig. 4) to an arm 70 which is mounted for swinging movement on the rod 56 (Fig. 2) and is normally maintained in an open position, as shown at station 4 in Fig. 1, by a spring 72 one end of which is anchored to a screw 74 in the arm 70 and the other end to a screw 75 in the gear plate 30. It will be understood that mechanism such as that above described is provided in each apparatus 14 for maintaining the arm 70 normally in its open position.

The arm 70 has an extension 76 reaching from the rod 56 to cam plate 26 which is affixed with a screw 78 to the shaft 34. A cam roll 22 mounted on the extension 76 rides on the cam surface 80 of the cam 26 to actuate the movable side member 20, as will be described hereinafter with the aid of the cam chart in Fig. 7. The spring 72 could be mounted to maintain the arm 20 in a normally closed position, in which event the cam system would be modified to cause that arm to open at the proper times.

End member 16 has an arm 82 and a head 84 shaped to fit between the side members 18 and 20. The head 84 has a flat face 86 disposed to prevent work pieces from sliding down the inclined bottom member 36, as shown at *a* in Fig. 3, and further disposed to lift the work pieces during the rapping or agitating operation. The arm 88 is rotatably mounted on a lug 88 extending from the lower plate 48. A tension spring 90 attached to an extension 92 on the end member and to an extension 94 on the underside of the plate 48 provides a downward force which tends to hold the end member 16 firmly in a normal rest position, as shown at *a* in Fig. 3, in which the head 84 is slightly above the bottom member 36 of the laminating apparatus 14, and further which causes the end member 16 to return quickly to this position following its rapping and retracting motions. The arm 82 has an extension 96 on its underside. The cam roll 24 is mounted on this extension 96 and rides on the cam surface 98 of the cam 28 which is integral with a wedge-shaped bracket 100 secured in fixed relationship to the shaft 34 by a key 102, and which extends only part way around the base, see Fig. 1. The end member arm 82 is actuated by this moving contact of the cam roll 24 on the cam surface 98, as will be described hereinafter with reference to the cam chart in Fig. 7.

The lower plate 48 is provided with an indentation 104 located to permit the end member arm 82 to rise when it is actuated. A U-shaped bracket 106 bridges the underside of the indentation 104 and serves as a rest for the arm 82. The U-shaped bracket is equipped with a screw 108 on which the arm 82 rests and which can be adjusted heightwise and fixed by a lock nut 110, to control the heightwise rest position of the end member head 84.

Electrical heating elements 112 in the side members 18 and 20 receive the power necessary for their operation from an outside source through slip rings 114 which are mounted on a reduced portion 116 of the shaft 34 and held in fixed relation thereon by means of a screw 118. These slip rings are contacted by brushes 120 mounted on the rotatable upper table 50 and the current picked up by them is transferred through wires 122 to the heating elements 112.

In the laminating apparatus described the end member 16 provides the alining and work discharging functions. It will readily be seen that the bottom member 36 could be adapted to provide either or both of these functions. Thus, work pieces would rest in the angle between the end member and the bottom member, and the latter would be movable to aline and/or retract to permit the discharge of the work pieces. Furthermore, the herein cam systems employed to actuate the operating members of the laminating apparatuses could be replaced with other means for actuating these members. An example would be the provision of locks to hold the side and end members in their various operating positions following their being placed in those positions by the action of a suitable actuating means. Operable means for actuating and holding the operating members will suggest themselves to those skilled in the art. An added modification which could be made in the apparatus would be the provision of a member external to the end and bottom members for alining the work pieces.

A blocker insole 124 prepared in the apparatus of the present invention is shown in Fig. 6, partly broken away, partly in section, and partly peeled back. A porous plastic piece 126 is sandwiched between two fiber pieces 128 and bonded thereto by an adhesive 130.

The mode of operation of the several operating members of the machine will now be explained with reference to the bonding of work pieces comprising the elements of a blocker insole.

Work pieces to be laminated are precut to the peripheral shape of the blocker insole to be formed and to thicknesses which permit preparation from them of a blocker insole suitable for splitting into a pair of insoles. The work pieces, in the order in which they are combined, are a fiber backing member 128, a porous plastic member 126 and a fiber backing member 128. These work pieces are coated on their contacting faces with a heat activatable adhesive 130 and the adhesive is dried, following which the work pieces are inserted in proper relation in one of the laminating apparatuses 14. When they are so inserted the work pieces rest on the inclined bottom member 36 and abut against the face 86 of the end member 16 while they are retained in edgewise relation to these members 36 and 86 by the side members 18 and 20.

Figure 3:
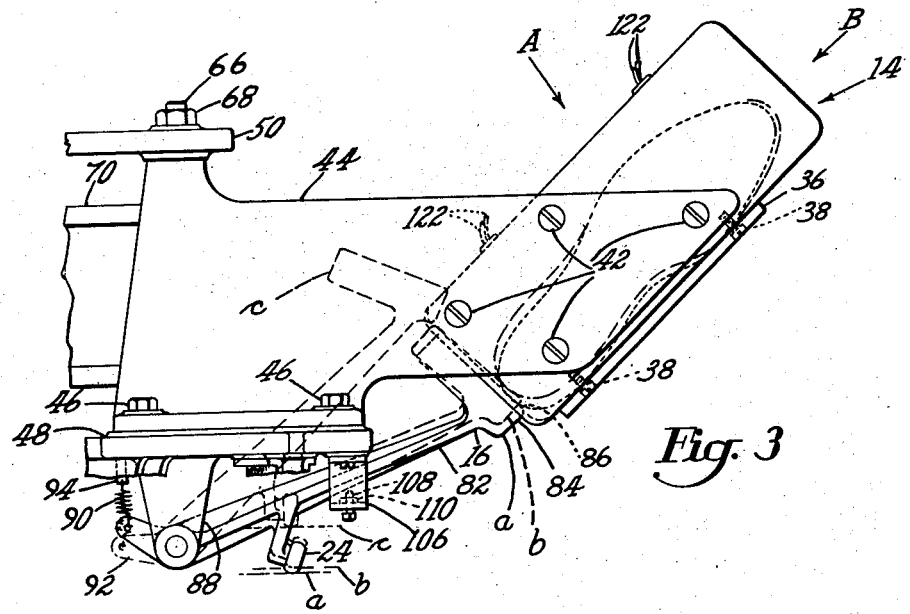
Fig. 3 is a view in elevation of one of the laminating apparatuses in Fig. 1, separate from the machine of Fig. 1.

The functions of the operating members of the laminating apparatuses will be described more fully with reference to the figures. Positions 1 through 5 in Fig. 1 represent steps in the laminating process. An individual laminating apparatus 14 of the machine in Fig. 1 is shown in Fig. 3 with the three operating levels of the end member 16 appearing, two of them in phantom. An individual laminating apparatus of the machine in Fig. 1 is shown in Fig. 4 in positions 1 and 2A. One of the laminating apparatuses of the machine in Fig. 1 is shown in Fig. 5 in position 5.

Figure 7:
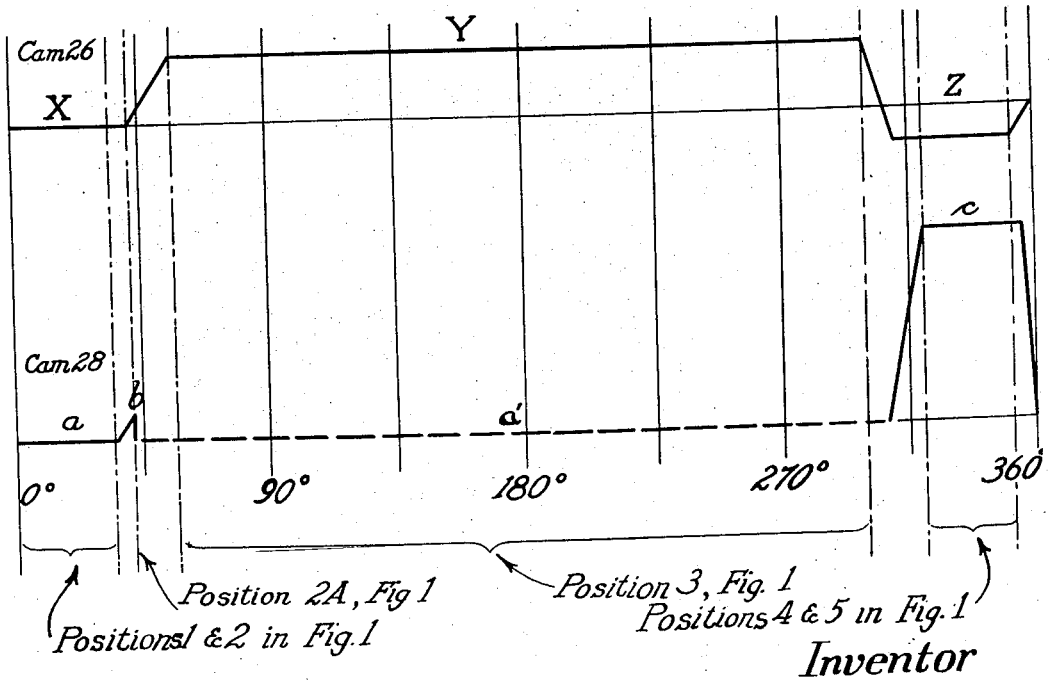
Fig. 7 is a cam chart.

Cams 26 and 28 on which cam rolls 22 and 24 ride and by which they are actuated are shown in their time relationships in Fig. 7. Cam 26, through which the side members 18 and 20 are actuated, will be seen in Fig. 7 to have intermediate, upper and lower dwells X, Y and Z, respectively, which dwells correspond to the partly-open, work pressing, and open positions, respectively, of the side members 18 and 20. End member 16 is actuated through the cam 28, which has lower, intermediate and upper dwells, *a*, *b*, and *c*, respectively, which dwells correspond to the work supporting, rapping, and work discharging positions, respectively, of the end member 16. The lower dwell *a* extends only between the intermediate and upper dwells *b* and *c*, respectively. The screw 108 is positioned to support the end member arm 82, and accordingly the end member 16, in work supporting position when the cam roll 24 is out of engagement with cam 28. This is shown in Fig. 7 as position *a'*, and extends between dwells *b* and *c* of the cam 28.

In the following description of the operation of the laminating apparatus 14, the cam dwells will be referred to according to the above designations in order to correlate the various operating positions of the end member 16 and the side member 20 of the laminating apparatus 14 with the cam systems.

At positions 1 and 2 in Fig. 1 the cam roll 22 rides on the intermediate dwell X of the cam 26 (see X in Figs. 1 and 7) and the side members 18 and 20 are partly open, i.e. ready to receive work. The cam roll 24 rides on the lower dwell *a* of the cam 28 (see *a* in Figs. 3 and 7) and the end member 16 is at rest and in a position to support the work. This position of the end member 16 and side members 18 and 20 is also represented in Fig. 4 where the view is looking in the direction of arrow A in Fig. 3.

Immediately prior to position 2A in Fig. 1, the work rapping or alining operation occurs. The cam roll 22 continues to ride on the intermediate dwell X of the cam 26 and consequently the side members 18 and 20 remain partly open. The cam roll 24 rises to the brief intermediate dwell *b* of the cam 28 (see *b* in Figs. 3 and 7) and then drops sharply with the result that the end member 16 rises slightly to rap the work and then drops abruptly to its rest or work supporting position (see *a* in Fig. 3). In the form shown the end member face 86 is inclined at an angle to lift as well as to rap the work pieces when it is actuated. Other forms of head which will engage and lift the work pieces, and other rapping motions could be used. The rapping operation imparts a sharp jolt to the work pieces thereby loosening them from each other and from the walls so that they fall into alinement. Since the cam 28 ends with dwell *b*, the cam roll 24 rides in the air, while the end member 16 is supported by the screw 108 (see *a'* in Fig. 7). The end member continues thus to be supported until the cam roll 24 engages the cam 28 at the rise leading to dwell *c*.

Following this brief rapping operation, the laminating apparatus 14 reaches position 2A, where cam roll 22 rides on the rise between the intermediate and upper dwells X and Y respectively of the cam 26 (see X and Y in Fig. 1), thereby forcing side member 20 toward side member 18 to press the work pieces. The cam roll 24 continues to be out of engagement with cam 28 (see Figs. 1 and 7) and the end member 16 rests on the screw 108, where it remains through position 4 (see Fig. 1) in work supporting disposition.

Position 3 in Fig. 1 is the first of the work pressing positions. The cam roll 22 rides on the upper dwell Y of the cam 26 (see Y in Fig. 1) and maintains the side members 18 and 20 in pressing contact with the work pieces, while the end member 16 continues as stated above in work supporting position.

The side members 18 and 20 and end member 16 remain closed and at rest, respectively, while the laminating apparatus 14 rotates about the base 12 to a position immediately before position 4 in Fig. 1. At this point the cam roller 22 rides down the drop between the upper and lower dwells Y and Z, respectively, of the cam 26, and at positions 4 and 5 it rides on the lower dwell Z of the cam 26 (see Fig. 1) with the result that the side members 18 and 20 are open. Immediately before position 4 in Fig. 1 the cam roll 24 engages the cam 28 and it rises to the upper dwell *c* of the cam 28 (see *c* in Fig 7 and Fig. 3) where it rides through position 5 in Fig. 1. The end member 16 thus is raised to a height suitable to open a passageway through which the work is discharge by gravity from the apparatus (see *c* in Fig. 3). This position of the side 18 and 20 and end 16 members is also shown in Figs. 4 and 5.

Following this complete cycle, the laminating apparatus 14 returns to position 1 (see Fig. 1) where it receives further work pieces.

Thus, preshaped work pieces which are inserted into the laminating apparatus as individual pieces are laminated together to form a unitary product of uniform appearance and quality. This is accomplished smoothly and rapidly through the cooperation of the members of the laminating apparatus in supporting the work pieces in edgewise relation to the inclined bottom member, in alining them, in retaining them in alined relation prior to and during the operation wherein they are pressed into a laminated unitary product and in discharging that product from the apparatus.

Having thus described my invention, what I claim as new and desire to secure by Letters Patent of the United States is:

1. In combination, a pair of mutually opposed pressure applying platens, means for effecting relative movement of approach of the platens to press work pieces between them, a first work supporting member arranged substantially at right angles to the platens, a second work supporting member constructed and arranged to hold the work against movement from its position between the platens, an arm on which the second work supporting member is carried, a fulcrum element on which the arm is mounted for angular movement, the relative arrangement of the second work supporting member, the arm and the fulcrum element being such that a slight angular movement of the arm with the member in work supporting position causes a movement of the work pieces both widthwise and lengthwise thereof between the platens, such movement being calculated to effect mutual alinement of the work pieces, and means for imparting to the arm angular movement sufficient in extent to move the second work supporting member out of its work supporting position thereby to open a passageway through which the work pieces move from their position between the platens.

2. In combination, a pair of mutually opposed pressure applying platens, means for effecting relative movement of approach of the platens to press work pieces between them, a first work support substantially perpendicular to the platens, a second work support constructed and arranged to hold the work against movement from its position between the platens, and a fixed circular cam rail having a first rise which is rendered effective by a movement of translation of the work supporting and pressure applying assemblies in a path common to the cam rail to agitate the second work support without moving it out of work supporting position, said cam rail having a second rise which is rendered effective by further movement of translation of the work supporting and pressure applying assembly in the path above indicated to impart to the second work support a movement of translation of sufficient extent to open a passageway for the work.

3. Machine for utilization in the automatic lamination of work pieces, comprising a fixed base, a plurality of laminating apparatuses mounted for rotation on said fixed base, and means for operating said laminating apparatuses, each of said laminating apparatuses comprising a receptacle for receiving work pieces to be laminated, said receptacle including an inclined bottom member, two side members, and an end member, said side members being normally spaced to maintain work pieces disposed between them in edgewise relation to said inclined bottom member, and said end member being normally disposed to prevent work pieces in the receptacle from sliding down said bottom member, said means including a first cam and a second cam attached to said fixed base, cam followers which ride on said first cam operative to move side members to press work pieces between said side members and other side members, and further cam followers operative to move said end members to rap the work pieces to aline them and being further operative to move the end members to permit the work pieces to fall from the apparatuses, the surfaces of said cams being so disposed with respect to the motion of the laminating apparatuses about said base as to actuate the above operating motions in proper timed relationship.

References Cited in the file of this patent

UNITED STATES PATENTS

| | | |
|---|---|---|
| 705,198 | Bowman | July 22, 1902 |
| 920,541 | Chesson | May 4, 1909 |
| 1,008,867 | Shee | Nov. 14, 1911 |
| 1,157,409 | Mitchell et al. | Oct. 19, 1915 |
| 1,494,339 | Clauberg | May 20, 1924 |
| 1,645,567 | Winkley | Oct. 18, 1927 |
| 1,798,685 | Kurtenbach | Mar. 31, 1931 |
| 1,891,286 | Miersch | Dec. 20, 1932 |
| 1,898,889 | Parks | Feb. 21, 1933 |
| 1,928,923 | Anderson | Oct. 3, 1933 |
| 2,078,037 | Snyder et al. | Apr. 20, 1937 |
| 2,101,420 | Scofield | Dec. 7, 1937 |
| 2,550,292 | Platt et al. | Apr. 24, 1951 |
| 2,573,612 | Scheinker | Oct. 30, 1951 |
| 2,693,843 | Magnus | Nov. 9, 1954 |